United States Patent
Gass et al.

(10) Patent No.: US 7,137,326 B2
(45) Date of Patent: Nov. 21, 2006

(54) TRANSLATION STOP FOR USE IN POWER EQUIPMENT

(75) Inventors: Stephen F. Gass, Wilsonville, OR (US); David A. Fanning, Vancouver, WA (US)

(73) Assignee: SD3, LLC, Wilsonville, OR (US)

( * ) Notice: Subject to any disclaimer, the term of this patent is extended or adjusted under 35 U.S.C. 154(b) by 258 days.

(21) Appl. No.: 09/929,425

(22) Filed: Aug. 13, 2001

(65) Prior Publication Data

US 2002/0017175 A1 Feb. 14, 2002

Related U.S. Application Data

(60) Provisional application No. 60/225,056, filed on Aug. 14, 2000, provisional application No. 60/255,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B23D 45/04* (2006.01)

(52) U.S. Cl. .............................. 83/58; 83/485; 83/490; 83/DIG. 1

(58) Field of Classification Search ............ 83/DIG. 1, 83/58, 62.1, 526, 72, 76.8, 471.2, 397, 473, 83/477.1, 485, 487, 490, 491, 522.12, 544, 83/546, 564, 581, 590, 665, 471.3; 337/1, 337/5, 10, 17, 70, 140, 148, 170, 190, 237, 337/239; 403/2, 28; 411/2, 39, 390; 335/142; 74/2; 292/290, DIG. 66; 307/116, 142, 307/131; 192/129 R, 133, 148, 144, 142 R, 192/131, 137; 30/382, 381; 361/1, 124; 144/384, 391, 427, 154.5, 356; 340/530, 340/590, 680

See application file for complete search history.

(56) References Cited

U.S. PATENT DOCUMENTS 146,886 A 1/1874 Doane et al.

(Continued)

FOREIGN PATENT DOCUMENTS

CH 297525 6/1954

(Continued)

OTHER PUBLICATIONS

Gordon Engineering Corp., Product Catalog, Oct. 1997, pgs. cover, 1,3 and back, Brookfield, Connecticut, US.

(Continued)

*Primary Examiner*—Kenneth E. Peterson

(57) ABSTRACT

Woodworking machines are disclosed having cutting tools movable into a cutting zone for cutting workpieces. The machines include a detection system adapted to detect one or more dangerous conditions between a person and the cutting tool, and a reaction system adapted to stop motion of the cutting tool into the cutting zone upon detection of the dangerous condition by the detection system.

15 Claims, 3 Drawing Sheets

U.S. PATENT DOCUMENTS

| | | | |
|---|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlmann et al. |
| 0,302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A * | 5/1945 | Rady .................. 200/302.1 |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A * | 5/1950 | Dineen .................. 192/101 |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A * | 4/1954 | Brown ......................... 74/2 |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 6/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |

| | | | | | |
|---|---|---|---|---|---|
| 3,085,602 A | 4/1963 | Gaskell | 3,978,624 A | 9/1976 | Merkel et al. |
| 3,105,530 A | 10/1963 | Peterson | 3,994,192 A | 11/1976 | Faig |
| 3,129,731 A | 4/1964 | Tyrrell | 4,007,679 A | 2/1977 | Edwards |
| 3,163,732 A * | 12/1964 | Abbott et al. ............... 337/128 | 4,016,490 A | 4/1977 | Weckenmann et al. |
| 3,184,001 A | 5/1965 | Reinsch et al. | 4,026,174 A | 5/1977 | Fierro |
| 3,186,256 A | 6/1965 | Reznick | 4,026,177 A | 5/1977 | Lokey |
| 3,207,273 A * | 9/1965 | Jurin ............................ 49/7 | 4,029,159 A | 6/1977 | Nymann |
| 3,213,731 A | 10/1965 | Renard | 4,047,156 A | 9/1977 | Atkins |
| 3,224,474 A | 12/1965 | Bloom | 4,048,886 A | 9/1977 | Zettler |
| 3,232,326 A | 2/1966 | Speer et al. | 4,060,160 A | 11/1977 | Lieber |
| 3,246,205 A | 4/1966 | Miller | 4,070,940 A | 1/1978 | McDaniel et al. |
| 3,249,134 A | 5/1966 | Vogl et al. | 4,075,961 A | 2/1978 | Harris |
| 3,276,497 A | 10/1966 | Heer | 4,077,161 A | 3/1978 | Wyle et al. |
| 3,306,149 A | 2/1967 | John | 4,085,303 A | 4/1978 | McIntyre et al. |
| 3,313,185 A | 4/1967 | Drake et al. | 4,090,345 A | 5/1978 | Harkness |
| 3,315,715 A | 4/1967 | Mytinger | 4,091,698 A | 5/1978 | Obear et al. |
| 3,323,814 A * | 6/1967 | Phillips ........................ 403/11 | 4,106,378 A | 8/1978 | Kaiser |
| 3,337,008 A | 8/1967 | Trachte | 4,117,752 A | 10/1978 | Yoneda |
| 3,356,111 A | 12/1967 | Mitchell | 4,145,940 A | 3/1979 | Woloveke et al. |
| 3,386,322 A | 6/1968 | Stone et al. | 4,152,833 A | 5/1979 | Phillips |
| 3,439,183 A | 4/1969 | Hurst, Jr. | 4,161,649 A | 7/1979 | Klos et al. |
| 3,445,835 A | 5/1969 | Fudaley | 4,175,452 A | 11/1979 | Idel |
| 3,454,286 A | 7/1969 | Anderson et al. | 4,190,000 A | 2/1980 | Shaull et al. |
| 3,456,696 A | 7/1969 | Gregory et al. | 4,195,722 A | 4/1980 | Anderson et al. |
| 3,512,440 A | 5/1970 | Frydmann | 4,199,930 A | 4/1980 | Lebet et al. |
| 3,538,964 A | 11/1970 | Warrick et al. | 4,206,666 A | 6/1980 | Ashton |
| 3,540,338 A | 11/1970 | McEwan et al. | 4,206,910 A | 6/1980 | Biesemeyer |
| 3,554,067 A | 1/1971 | Scutella | 4,249,117 A | 2/1981 | Leukhardt et al. |
| 3,566,996 A | 3/1971 | Crossman | 4,249,442 A | 2/1981 | Fittery |
| 3,580,376 A | 5/1971 | Loshbough | 4,262,278 A | 4/1981 | Howard et al. |
| 3,581,784 A | 6/1971 | Warrick | 4,267,914 A | 5/1981 | Saar |
| 3,593,266 A | 7/1971 | Van Sickle | 4,270,427 A | 6/1981 | Colberg et al. |
| 3,613,748 A | 10/1971 | De Pue | 4,276,459 A | 6/1981 | Willett et al. |
| 3,621,894 A | 11/1971 | Niksich | 4,276,799 A | 7/1981 | Muehling |
| 3,670,788 A | 6/1972 | Pollak et al. | 4,291,794 A | 9/1981 | Bauer |
| 3,675,444 A * | 7/1972 | Whipple ........................ 464/160 | 4,305,442 A | 12/1981 | Currie |
| 3,680,609 A | 8/1972 | Menge | 4,321,841 A | 3/1982 | Felix |
| 3,688,815 A | 9/1972 | Ridenour | 4,372,202 A | 2/1983 | Cameron |
| 3,695,116 A | 10/1972 | Baur | 4,391,358 A * | 7/1983 | Haeger ........................ 192/130 |
| 3,696,844 A | 10/1972 | Bernatschek | 4,418,597 A | 12/1983 | Krusemark et al. |
| 3,716,113 A | 2/1973 | Kobayashi et al. | 4,427,042 A | 1/1984 | Mitchell et al. |
| 3,719,103 A | 3/1973 | Streander | 4,466,170 A | 8/1984 | Davis |
| 3,745,546 A | 7/1973 | Struger et al. | 4,466,233 A | 8/1984 | Thesman |
| 3,749,933 A | 7/1973 | Davidson | 4,470,046 A | 9/1984 | Betsill |
| 3,754,493 A | 8/1973 | Niehaus et al. | 4,510,489 A | 4/1985 | Anderson, III et al. |
| 3,772,590 A | 11/1973 | Mikulecky et al. | 4,512,224 A | 4/1985 | Terauchi |
| 3,785,230 A | 1/1974 | Lokey | 4,518,043 A | 5/1985 | Anderson et al. |
| 3,793,915 A | 2/1974 | Hujer | 4,532,501 A | 7/1985 | Hoffman |
| 3,805,639 A | 4/1974 | Peter | 4,532,844 A | 8/1985 | Chang et al. |
| 3,805,658 A | 4/1974 | Scott et al. | 4,557,168 A | 12/1985 | Tokiwa |
| 3,808,932 A | 5/1974 | Russell | 4,559,858 A | 12/1985 | Laskowski et al. |
| 3,829,850 A | 8/1974 | Gueterisich | 4,560,033 A | 12/1985 | DeWoody et al. |
| 3,829,970 A | 8/1974 | Anderson | 4,566,512 A | 1/1986 | Wilson |
| 3,858,095 A | 12/1974 | Friemann et al. | 4,573,556 A | 3/1986 | Andreasson |
| 3,861,016 A | 1/1975 | Johnson et al. | 4,576,073 A | 3/1986 | Stinson |
| 3,863,208 A | 1/1975 | Balban | 4,589,047 A | 5/1986 | Gaus et al. |
| 3,880,032 A | 4/1975 | Green | 4,589,860 A | 5/1986 | Brandenstein et al. |
| 3,882,744 A | 5/1975 | McCarroll | 4,599,597 A * | 7/1986 | Rotbart ........................ 337/206 |
| 3,886,413 A | 5/1975 | Dow et al. | 4,599,927 A | 7/1986 | Eccardt et al. |
| 3,889,567 A | 6/1975 | Sato et al. | 4,606,251 A | 8/1986 | Boileau |
| 3,922,785 A | 12/1975 | Fushiya | 4,615,247 A | 10/1986 | Berkeley |
| 3,924,688 A | 12/1975 | Cooper et al. | 4,621,300 A | 11/1986 | Summerer |
| 3,931,727 A | 1/1976 | Luenser | 4,625,604 A | 12/1986 | Handler et al. |
| 3,935,777 A | 2/1976 | Bassett | 4,637,188 A | 1/1987 | Crothers |
| 3,945,286 A | 3/1976 | Smith | 4,637,289 A | 1/1987 | Ramsden |
| 3,946,631 A | 3/1976 | Malm | 4,644,832 A | 2/1987 | Smith |
| 3,947,734 A | 3/1976 | Fyler | 4,653,189 A | 3/1987 | Andreasson |
| 3,949,636 A | 4/1976 | Ball et al. | 4,657,428 A | 4/1987 | Wiley |
| 3,953,770 A | 4/1976 | Hayashi | 4,661,797 A * | 4/1987 | Schmall ........................ 340/561 |
| 3,960,310 A | 6/1976 | Nussbaum | 4,672,500 A | 6/1987 | Tholome et al. |
| 3,967,161 A | 6/1976 | Lichtblau | 4,675,664 A | 6/1987 | Cloutier et al. |
| 3,974,565 A | 8/1976 | Ellis | 4,679,719 A | 7/1987 | Kramer |
| 3,975,600 A | 8/1976 | Marston | 4,722,021 A | 1/1988 | Hornung et al. |

| | | | | | |
|---|---|---|---|---|---|
| 4,751,603 A | 6/1988 | Kwan | 5,513,548 A | 5/1996 | Garuglieri |
| 4,756,220 A | 7/1988 | Olsen et al. | 5,531,147 A | 7/1996 | Serban |
| 4,757,881 A | 7/1988 | Jonsson et al. | 5,534,836 A | 7/1996 | Schenkel et al. |
| 4,774,866 A | 10/1988 | Dehari et al. | 5,572,916 A | 11/1996 | Takano |
| 4,792,965 A | 12/1988 | Morgan | 5,587,618 A | 12/1996 | Hathaway |
| 4,805,504 A | 2/1989 | Fushiya et al. | 5,592,353 A | 1/1997 | Shinohara et al. |
| 4,831,279 A | 5/1989 | Ingraham | 5,606,889 A | 3/1997 | Bielinski et al. |
| 4,840,135 A | 6/1989 | Yamauchi | 5,619,896 A | 4/1997 | Chen |
| 4,845,476 A | 7/1989 | Rangeard et al. | 5,623,860 A | 4/1997 | Schoene et al. |
| 4,864,455 A | 9/1989 | Shimomura et al. | 5,647,258 A | 7/1997 | Brazell et al. |
| 4,875,398 A | 10/1989 | Taylor et al. | 5,648,644 A | 7/1997 | Nagel |
| 4,896,607 A | 1/1990 | Hall et al. | 5,659,454 A | 8/1997 | Vermesse |
| 4,906,962 A | 3/1990 | Duimstra | 5,667,152 A | 9/1997 | Mooring |
| 4,907,679 A | 3/1990 | Menke | 5,671,633 A | 9/1997 | Wagner |
| 4,934,233 A | 6/1990 | Brundage et al. | 5,695,306 A | 12/1997 | Nygren, Jr. |
| 4,936,876 A | 6/1990 | Reyes | 5,700,165 A | 12/1997 | Harris et al. |
| 4,937,554 A | 6/1990 | Herman | 5,722,308 A | 3/1998 | Ceroll et al. |
| 4,964,450 A | 10/1990 | Hughes et al. | 5,724,875 A | 3/1998 | Meredith et al. |
| 4,965,909 A | 10/1990 | McCullough et al. | 5,730,165 A | 3/1998 | Philipp |
| 4,975,798 A | 12/1990 | Edwards et al. | 5,741,048 A | 4/1998 | Eccleston |
| 5,020,406 A | 6/1991 | Sasaki et al. | 5,755,148 A | 5/1998 | Stumpf et al. |
| 5,025,175 A | 6/1991 | Dubois, III | 5,771,742 A | 6/1998 | Bokaie et al. |
| 5,042,348 A | 8/1991 | Brundage et al. | 5,782,001 A | 7/1998 | Gray |
| 5,046,426 A | 9/1991 | Julien et al. | 5,787,779 A | 8/1998 | Garuglieri |
| 5,052,255 A | 10/1991 | Gaines | 5,791,223 A | 8/1998 | Lanzer |
| 5,074,047 A | 12/1991 | King | 5,791,224 A | 8/1998 | Suzuki et al. |
| 5,081,406 A | 1/1992 | Hughes et al. | 5,791,441 A | 8/1998 | Matos et al. |
| 5,082,316 A * | 1/1992 | Wardlaw ............... 292/201 | 5,819,619 A | 10/1998 | Miller et al. |
| 5,083,973 A | 1/1992 | Townsend | 5,852,951 A | 12/1998 | Santi |
| 5,086,890 A | 2/1992 | Turczyn et al. | 5,857,507 A | 1/1999 | Puzio et al. |
| 5,094,000 A | 3/1992 | Becht et al. | 5,861,809 A | 1/1999 | Eckstein et al. |
| 5,116,249 A | 5/1992 | Shiotani et al. | 5,875,698 A | 3/1999 | Ceroll et al. |
| 5,119,555 A | 6/1992 | Johnson | 5,880,954 A | 3/1999 | Thomson et al. |
| 5,122,091 A | 6/1992 | Townsend | 5,921,367 A | 7/1999 | Kashioka et al. |
| 5,146,714 A * | 9/1992 | Luber ..................... 451/5 | 5,927,857 A | 7/1999 | Ceroll et al. |
| 5,174,349 A | 12/1992 | Svetlik et al. | 5,930,096 A | 7/1999 | Kim |
| 5,184,534 A | 2/1993 | Lee | 5,937,720 A | 8/1999 | Itzov |
| 5,198,702 A | 3/1993 | McCullough et al. | 5,942,975 A | 8/1999 | Sorensen |
| 5,199,343 A | 4/1993 | OBanion | 5,943,932 A | 8/1999 | Sberveglieri |
| 5,201,110 A | 4/1993 | Bane | 5,950,514 A | 9/1999 | Benedict et al. |
| 5,201,684 A | 4/1993 | DeBois, III | 5,963,173 A | 10/1999 | Lian et al. |
| 5,206,625 A | 4/1993 | Davis | 5,974,927 A | 11/1999 | Tsune |
| 5,207,253 A | 5/1993 | Hoshino et al. | 5,989,116 A | 11/1999 | Johnson et al. |
| 5,212,621 A | 5/1993 | Panter | 6,009,782 A | 1/2000 | Tajima et al. |
| 5,218,189 A | 6/1993 | Hutchison | 6,018,284 A | 1/2000 | Rival et al. |
| 5,231,359 A | 7/1993 | Masuda et al. | 6,037,729 A | 3/2000 | Woods et al. |
| 5,231,906 A | 8/1993 | Kogej | 6,052,884 A | 4/2000 | Steckler et al. |
| 5,239,978 A | 8/1993 | Plangetis | 6,062,121 A | 5/2000 | Ceroll et al. |
| 5,245,879 A * | 9/1993 | McKeon .................. 74/2 | 6,070,484 A | 6/2000 | Sakamaki |
| 5,257,570 A | 11/1993 | Shiotani et al. | 6,095,092 A | 8/2000 | Chou |
| 5,265,510 A | 11/1993 | Hoyer-Ellefsen | 6,112,785 A | 9/2000 | Yu |
| 5,272,946 A | 12/1993 | McCullough et al. | 6,119,984 A | 9/2000 | Devine |
| 5,276,431 A | 1/1994 | Piccoli et al. | 6,133,818 A | 10/2000 | Hsieh et al. |
| 5,293,802 A | 3/1994 | Shiotani et al. | 6,141,192 A | 10/2000 | Garzon |
| 5,320,382 A | 6/1994 | Goldstein et al. | 6,148,703 A | 11/2000 | Ceroll et al. |
| 5,321,230 A | 6/1994 | Shanklin et al. | 6,150,826 A | 11/2000 | Hokodate et al. |
| 5,331,875 A | 7/1994 | Mayfield | 6,161,459 A | 12/2000 | Ceroll et al. |
| 5,353,670 A | 10/1994 | Metzger, Jr. | 6,170,370 B1 | 1/2001 | Sommerville |
| 5,377,554 A | 1/1995 | Reulein et al. | 6,244,149 B1 | 6/2001 | Ceroll et al. |
| 5,392,568 A | 2/1995 | Howard, Jr. et al. | 6,250,190 B1 | 6/2001 | Ceroll et al. |
| 5,392,678 A | 2/1995 | Sasaki et al. | 6,257,061 B1 | 7/2001 | Nonoyama et al. |
| 5,401,928 A | 3/1995 | Kelley | 6,325,195 B1 | 12/2001 | Doherty |
| 5,411,221 A | 5/1995 | Collins et al. | 6,330,848 B1 | 12/2001 | Nishio et al. |
| 5,423,232 A | 6/1995 | Miller et al. | 6,336,273 B1 | 1/2002 | Nilsson et al. |
| 5,436,613 A | 7/1995 | Ghosh et al. | 6,352,137 B1 | 3/2002 | Stegall et al. |
| 5,447,085 A | 9/1995 | Gochnauer | 6,357,328 B1 | 3/2002 | Ceroll et al. |
| 5,451,750 A | 9/1995 | An | 6,366,099 B1 | 4/2002 | Reddi |
| 5,453,903 A | 9/1995 | Chow | 6,376,939 B1 | 4/2002 | Suzuki et al. |
| 5,471,888 A | 12/1995 | McCormick | 6,404,098 B1 | 6/2002 | Kayama et al. |
| 5,480,009 A | 1/1996 | Wieland et al. | 6,405,624 B1 | 6/2002 | Sutton |
| 5,503,059 A | 4/1996 | Pacholok | 6,418,829 B1 | 7/2002 | Pilchowski |
| 5,510,587 A | 4/1996 | Reiter | 6,420,814 B1 | 7/2002 | Bobbio |
| 5,510,685 A | 4/1996 | Grasselli | 6,427,570 B1 | 8/2002 | Miller et al. |

| | | |
|---|---|---|
| 6,430,007 B1 | 8/2002 | Jabbari |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B1 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,543,324 B1 | 4/2003 | Dils |
| 6,546,835 B1 | 4/2003 | Wang |
| 6,564,909 B1 | 5/2003 | Razzano |
| 6,575,067 B1 | 6/2003 | Parks et al. |
| 6,578,460 B1 | 6/2003 | Sartori |
| 6,578,856 B1 | 6/2003 | Kahle |
| 6,581,655 B1 | 6/2003 | Huang |
| 6,595,096 B1 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B1 | 9/2003 | Wang |
| 6,640,683 B1 | 11/2003 | Lee |
| 6,644,157 B1 | 11/2003 | Huang |
| 6,647,847 B1 | 11/2003 | Hewitt et al. |
| 6,659,233 B1 | 12/2003 | DeVlieg |
| 6,684,750 B1 | 2/2004 | Yu |
| 6,722,242 B1 | 4/2004 | Chuang |
| 6,734,581 B1 | 5/2004 | Griffis |
| 6,736,042 B1 | 5/2004 | Behne et al. |
| 6,742,430 B1 | 6/2004 | Chen |
| 6,796,208 B1 | 9/2004 | Jorgensen |
| 6,800,819 B1 | 10/2004 | Sato et al. |
| 6,826,988 B1 | 12/2004 | Gass et al. |
| 6,826,992 B1 | 12/2004 | Huang |
| 6,840,144 B1 | 1/2005 | Huang |
| 6,854,371 B1 | 2/2005 | Yu |
| 6,857,345 B1 | 2/2005 | Gass et al. |
| 6,874,397 B1 | 4/2005 | Chang |
| 6,874,399 B1 | 4/2005 | Lee |
| 6,883,397 B1 | 4/2005 | Kimizuka |
| 6,889,585 B1 | 5/2005 | Harris et al. |
| 6,920,814 B1 | 7/2005 | Gass et al. |
| 6,945,148 B1 | 9/2005 | Gass et al. |
| 6,945,149 B1 | 9/2005 | Gass et al. |
| 6,968,767 B1 | 11/2005 | Yu |
| 6,986,370 B1 | 1/2006 | Schoene et al. |
| 6,994,004 B1 | 2/2006 | Gass et al. |
| 6,997,090 B1 | 2/2006 | Gass et al. |
| 7,000,514 B1 | 2/2006 | Gass et al. |
| 2001/0032534 A1 | 10/2001 | Cerroll et al. |
| 2002/0017179 A1* | 2/2002 | Gass et al. ............... 83/58 |
| 2002/0017181 A1* | 2/2002 | Gass et al. ............... 83/58 |
| 2002/0020265 A1* | 2/2002 | Gass et al. ............. 83/62.1 |
| 2002/0043776 A1 | 4/2002 | Chuang |
| 2002/0050201 A1 | 5/2002 | Lane et al. |
| 2002/0056349 A1* | 5/2002 | Gass et al. ............. 83/62.1 |
| 2002/0059853 A1* | 5/2002 | Gass et al. ............... 83/62 |
| 2002/0059854 A1* | 5/2002 | Gass et al. ............... 83/62 |
| 2002/0059855 A1* | 5/2002 | Gass et al. ............... 83/62 |
| 2002/0088325 A1 | 7/2002 | Talesky et al. |
| 2002/0096030 A1 | 7/2002 | Wang |
| 2002/0109036 A1 | 8/2002 | Denen et al. |
| 2002/0134212 A1 | 9/2002 | Ceroll et al. |
| 2002/0170399 A1* | 11/2002 | Gass et al. ............. 83/62.1 |
| 2002/0174755 A1 | 11/2002 | Behne et al. |
| 2003/0000359 A1 | 1/2003 | Eccardt et al. |
| 2003/0037655 A1 | 2/2003 | Chin-Chin |
| 2003/0074873 A1 | 4/2003 | Freiberg et al. |
| 2003/0089212 A1 | 5/2003 | Parks et al. |
| 2003/0101857 A1 | 6/2003 | Chuang |
| 2003/0109798 A1 | 6/2003 | Kermani |
| 2003/0213349 A1 | 11/2003 | Chang |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194597 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2142571 | 1/1985 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Analog Devices, Inc., 3-Axis Capacitive Sensor—Preliminary Technical Data AD7103, pp. 1-40, © 1998.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30-50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer™ T-Square™ Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skit Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.

INCRA Incremental Micro Precision Table Saw Fence Owner's Manual, Taylor Design Group, Inc., 2003.

Shop Fox® Models W2005, W2006, W2007 Classic Fence Instruction Manual, Woodstock International, Jan. 2000, revised Mar. 2004.

ACCU-FENCE® 64A Fence and Rail System Owner's Manual, WMH Tool Group, Sep. 2004.

Unifence™ Saw Guide Instruction Manual, Delta Machinery, Feb. 22, 2005.

Biesemeyer® T-Square® Commercial Fence System Instruction Manual, Delta Machinery, May 2, 2005.

Laguna Tools table saw owner's manual, date unknown.

* cited by examiner

TRANSLATION STOP FOR USE IN POWER EQUIPMENT

CROSS-REFERENCE TO RELATED APPLICATION

This application claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

FIELD

The present invention relates to safety systems and more particularly to a safety system that stops translational motion of a cutting tool in power equipment.

BACKGROUND

Power equipment such as miter saws, chop saws and radial arm saws include circular blades that move down onto or across a workpiece to cut the workpiece. The blades, however, present a risk of injury to a user of the equipment as they move to make a cut. Accordingly, those saws often include blade guards that physically block an operator from making contact with the blade to minimize the risk of injury. In many cases, guards effectively reduce the risk of injury, however, there are many instances where the nature of the operations to be performed precludes using a guard that completely blocks access to hazardous machine parts. For example, a user of a radial arm saw draws the blade toward him as he cuts workpiece. The user typically holds the workpiece with one hand while operating the saw with his other hand. In such a situation, the saw blade is at least partially exposed so that the blade can cut the workpiece. While the blade is at least partially exposed, the blade may accidentally contact the user's finger and the user may continue pulling the blade into his finger before he can react.

DETAILED DESCRIPTION

Figure 1:
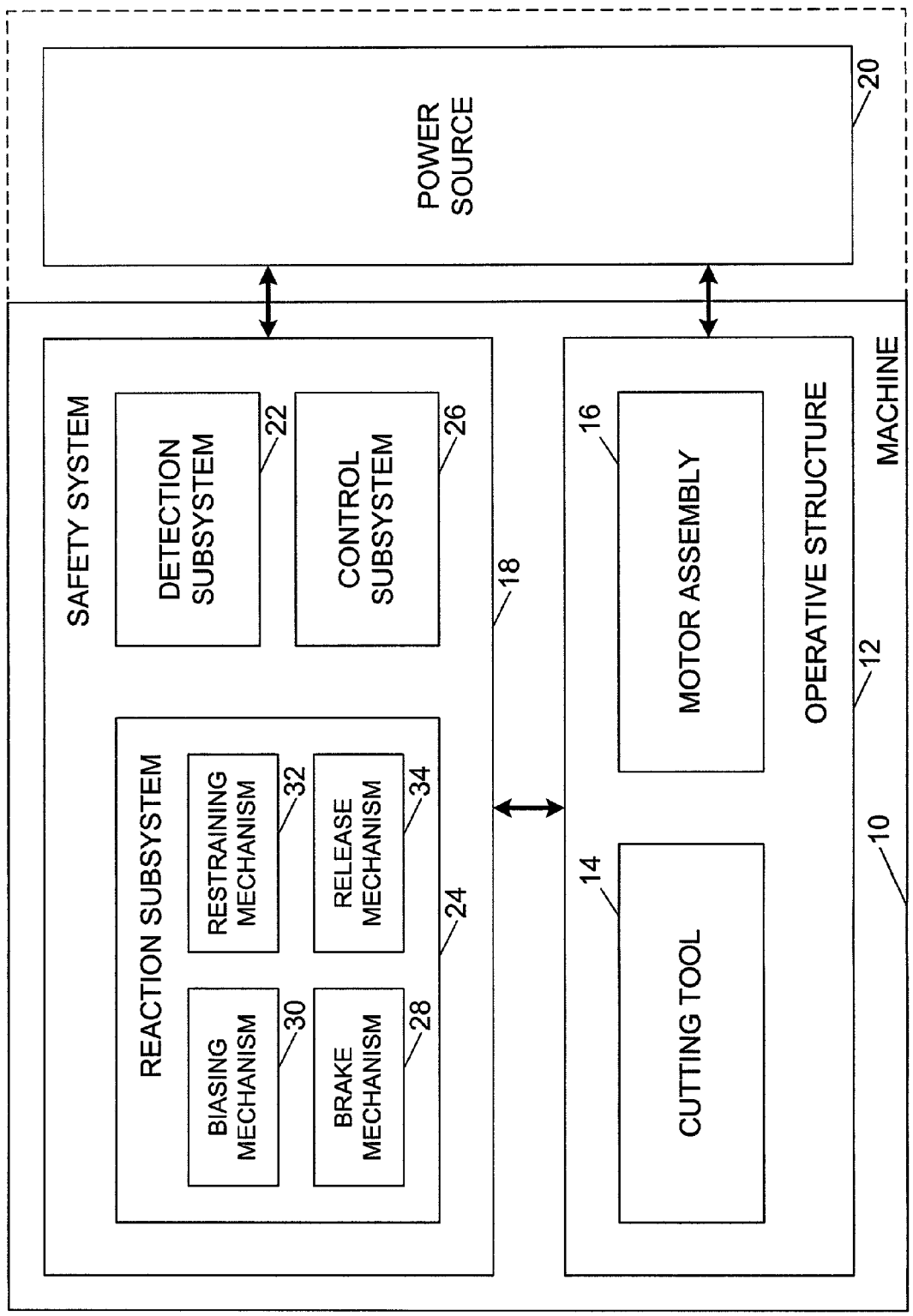
FIG. 1 is a schematic block diagram of a machine with a fast-acting safety system.

A machine that may incorporate a safety system according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, entitled "Cutting Tool Safety System," and U.S. patent application Ser. No. 09/929,226, filed Aug. 13, 2001, entitled "Cutting Tool Safety System," the disclosures of which are herein incorporated by reference. Retraction of the cutting tool from its operating position is described in more detail in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
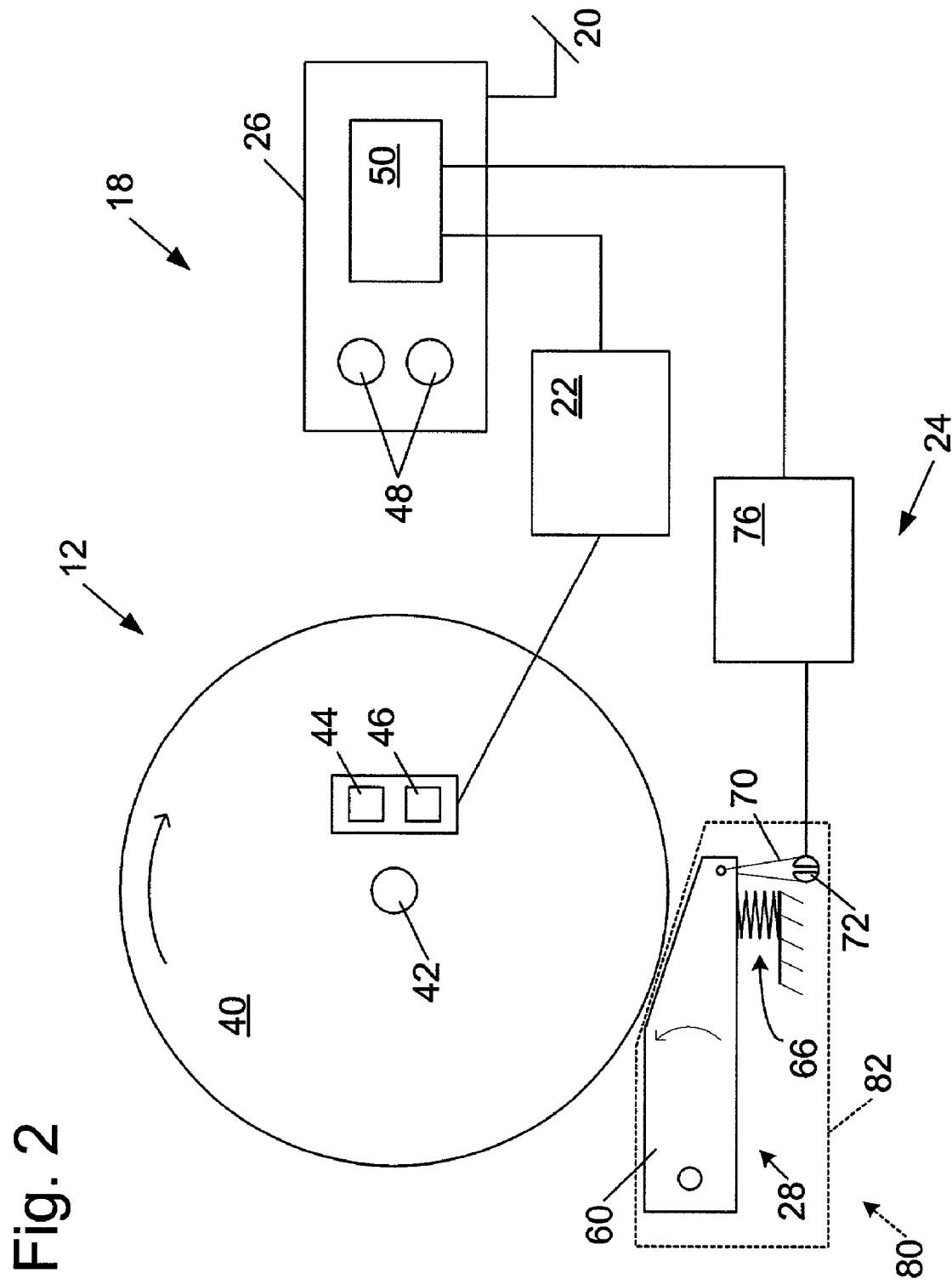
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,058, filed Aug. 14, 2000, entitled "Table Saw With Improved Safety System," U.S. patent application Ser. No. 09,929,235, filed Aug. 13, 2001, entitled "Table Saw With Improved Safety System," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System." the disclosures of which are herein incorporated by reference, describe safety system 18 in the context of particular types of machines 10.

In the exemplary implementation, detection subsystem 22 is adapted to dated the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. patent application Ser. No. 09/929,426, filed Aug. 13, 2001, entitled "Detection System For Power Equipment," U.S. Provisional Patent Application Ser. No. 60/225,211, filed Aug. 14, 2000, entitled "Apparatus And Method For Detecting Dangerous Conditions In Power Equipment," and U.S. patent application Ser. No. 09/929,221, filed Aug. 13, 2001, entitled "Apparatus And Method For Detection Dangerous Conditions In Power Equipment," the disclosures of which are herein incorporated by reference.

Control subsystem includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast-Acting Safety System," U.S. patent application Ser. No. 09/929,237, filed Aug. 13, 2001, entitled "Logic Control For Fast-Acting Safety System," U.S. Provisional Patent Application Ser. No. 60/225,094, filed Aug. 14, 2000, entitled "Motion Detecting System For Use In Safety System For Power Equipment," and U.S. patent application Ser. No. 09/929,234, filed Aug. 13, 2001, entitled "Motion Detecting System For Use In A Safety System For Power Equipment," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining member in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately ⅟32-inch to ¼-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In A Fast Acting Safety System," U.S. patent application Ser. No. 09/929,240, filed Aug. 13, 2001, entitled "Firing Subsystem For Use In A Fast Acting Safety System," U.S. Provisional Patent Application Ser. No. 60/225,170, filed Aug. 14, 2000, entitled "Spring-Biased Brake Mechanism For Power Equipment," U.S. patent application Ser. No. 09/929,227, filed Aug. 13, 2001, entitled "Spring-Biased Brake Mechanism For Power Equipment," U.S. Provisional Patent Application Ser. No. 60/225,169, filed Aug. 14, 2000, entitled "Brake Mechanism For Power Equipment," and U.S. patent application Ser. No. 09/929,241, filed Aug. 13, 2001, entitled "Brake Mechanism For Power Equipment," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset, such as by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. patent application Ser. No. 09/929,236, filed Aug. 13, 2001, entitled "Replaceable Brake Mechanism For Power Equipment," U.S. Provisional Patent Application Ser. No. 60/225,212, filed Aug. 14, 2000, entitled "Brake Positioning System," and U.S. patent application Ser. No. 09/929,244, filed Aug. 13, 2001, entitled Brake Positioning System," the disclosures of which are herein incorporated by reference. However, It should be noted that a cartridge is not required.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000 and U.S. Provisional Patent Application Ser. No. 60/157,340, filed Oct. 1, 1999, the disclosures of which are herein incorporated by reference.

In the case of miter saws, chop saws, radial arm saws, and other power equipment in which a cutting tool moves down onto or across a workpiece to cut the workpiece, reaction subsystem 24 can include a system to stop the cutting tool from continuing to move down onto or across the workpiece. Stopping the translational motion of the cutting tool can minimize any injury from accidental contact between a user and the cutting tool.

Figure 3:
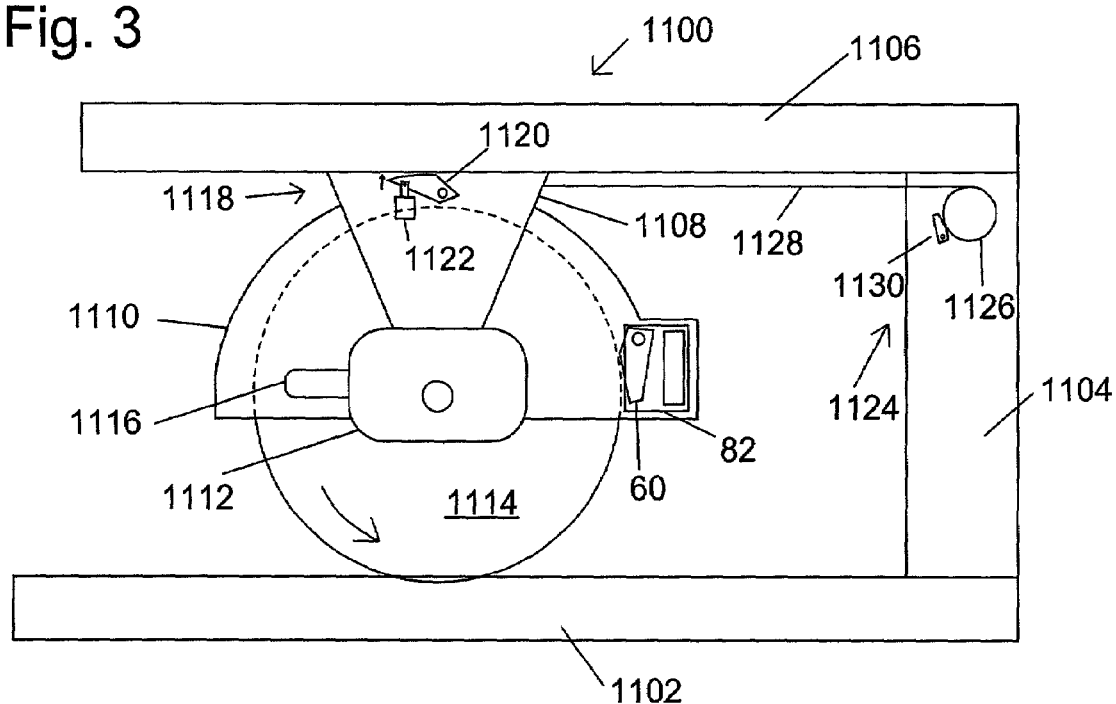
FIG. 3 is a side elevation of a radial arm saw equipped with a safety system.

FIG. 3 illustrates an exemplary implementation of a system to stop the translational motion of a cutting tool in the context of a radial arm saw 1100. Typically, radial arm saw 1100 includes a horizontal base 1102, a vertical support column 1104 extending upward from base 1102, and a guide arm 1106 that extends from column 1104 vertically spaced above base 1102. A carriage 1108 is slidably coupled to the underside of guide arm 1106. The bottom end of carriage 1108 is connected to a saw housing 1110 and to a motor assembly 1112, allowing a blade 1114 to be pulled across the base to cut workpieces (not shown) supported on the base. Radial arm saw 1100 is preferably equipped with a system as described above to stop the spinning of the blade, which includes a brake pawl 60 in a cartridge 82.

In use, a user grasps a handle 1116 on the saw and pulls the saw and blade across a workpiece on base 1102. In so doing, a user may accidentally pull the saw into contact with a misplaced finger or some other part of his body. Upon contact, brake pawl 60 works to stop the blade from spinning, but since the user may be pulling the saw toward his or her body when contact is detected, the saw may continue to move toward the user even after pawl 60 has stopped the blade. This continued movement may cause the stopped blade to be driven over a portion of the user's body (e.g., the user's hand), causing further injury. A system to stop the movement of the carriage and saw along the guide arm once contact is detected between the blade and the user's body addresses this issue.

It will be appreciated that there are a wide variety of ways to stop the sliding movement of bracket 1108 along arm 1106. FIG. 3 illustrates two examples. One example includes a pivoting wedge assembly 1118. Assembly 1118 includes a wedge or pawl 1120 pivotally coupled to guide bracket 1108. An actuator 1122 mounted on bracket 1108 is operatively coupled to the control and detection subsystems associated with brake pawl 60 and cartridge 82 so that when pawl 62 is released, actuator 1122 engages pawl 1120. During normal operation, actuator 1122 maintains the wedge spaced-apart from guide arm 1106. However, once contact between the blade and the user's body is detected, the detection system sends an actuation signal to actuator 1122. The signal sent to actuator 1122 may be the same signal that triggers the release of brake pawl 60, or it may be a different signal. In any event, upon receipt of the actuation signal, the actuator drives against wedge 1120, causing it to pivot into the guide arm, preventing further movement of the guide bracket forward along the guide arm. The wedge may be constructed or coated with a high friction material such as rubber, and/or may be configured with teeth, etc., to increase its braking action.

The other exemplary braking configuration illustrated in FIG. 3 includes a lockable spool assembly 1124. Assembly 1124 may be used in place of, or in addition to, wedge assembly 1118. In any event, the lockable spool assembly includes a spring-loaded spool 1126 mounted on support column 1104. One end of a tether or cable 1128 is attached to guide bracket 1108, while the other end is wound around spool 1126. As the user pulls the saw across the base, the spool unwinds, allowing the tether to extend. The spring-loading of the spool ensures that the spool maintains a slight tension on the tether and retracts the tether around the spool when the user pushes the saw back toward the support column. Assembly 1124 also includes a spool brake, such as pawl 1130, operatively coupled to the control and detection systems associated with brake pawl 60. Thus, when contact between the blade and the user's body is detected, an actuation signal is sent to the spool brake, causing the spool to lock. Once the spool locks, the tether prevents further movement of the saw away from support column 1104. In an alternative implementation of spool assembly 1124 not shown in FIG. 3, the lockable spool may be contained in, or placed adjacent to, cartridge 82, in which case the tether would run from the spool backward to support column 1104.

It will be appreciated that there are many alternative methods, devices, and configurations for stopping the travel of the guide bracket and the saw along the guide arm. Any one or more of these alternatives may be used in place of, or in addition to, the braking configurations illustrated in FIG. 3 and described above.

Figure 4:
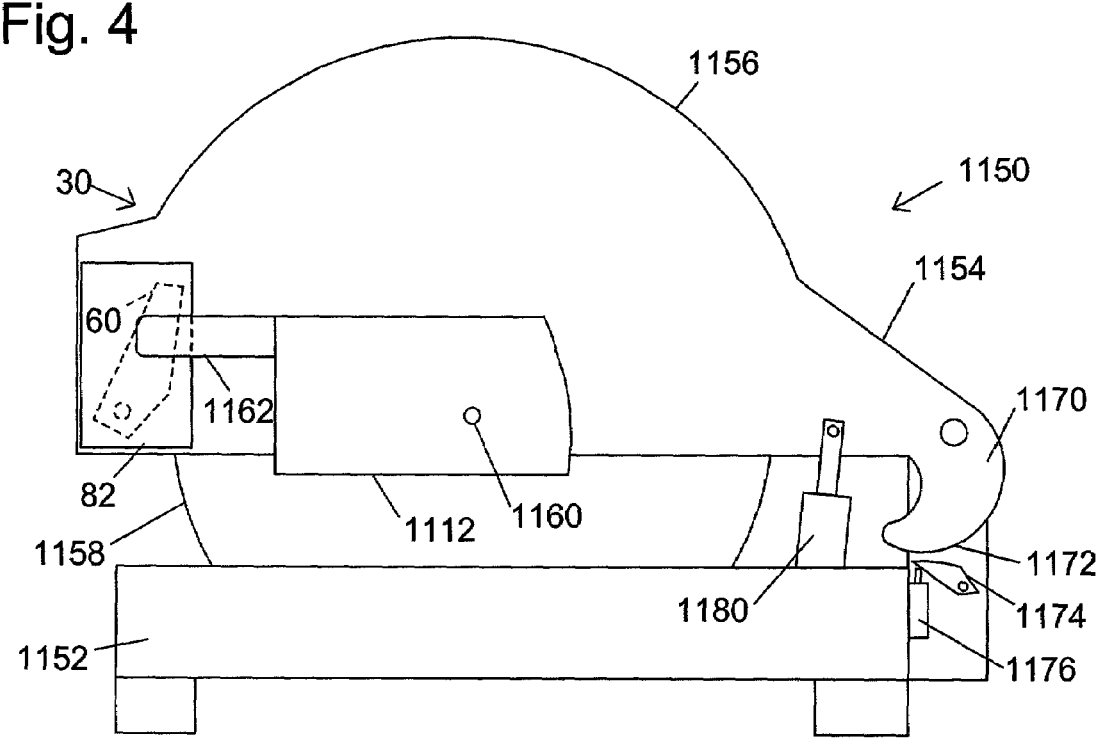
FIG. 4 is a side elevation of a miter saw or chop saw equipped with a safety system.

FIG. 4 illustrates an exemplary implementation of a system to stop the motion of a cutting tool in the context of a miter saw or chop saw 1150. It will be understood that miter saw 1150 may be any type of miter saw including a simple miter saw, compound miter saw, sliding compound miter saw, etc. Typically, miter saw 1150 includes a base or stand 1152 adapted to hold the workpiece to be cut. A swing arm 1154 is pivotally coupled to base 1152 to allow the arm to pivot downward toward the base. Attached to arm 1154 is a housing 1156 adapted to at least partially enclose a circular blade 1158. A motor assembly 1112 is coupled to the housing, and includes a rotating arbor 1160 on which the blade is mounted. Motor assembly 1112 includes a handle 1162 with a trigger (not shown) operable to run the saw. An optional blade guard (not shown) may extend from the bottom of housing 1156 to cover any portion of the blade exposed from the housing. A person uses miter saw 1150 by lifting the saw up, placing a workpiece on base 1152, and then bringing the saw down onto the workpiece to cut the workpiece.

Miter saw 1150 also preferably includes a brake pawl 60 in a cartridge 82 configured to stop the spinning of the blade, as described above. A saw blade spinning at several thousand revolutions per minute has substantial angular momentum. Thus, when the brake pawl engages and stops the blade, the angular momentum must be transferred to the brake. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade.

There are many suitable means for preventing the sudden downward movement of the swing arm. For example, the pivotal connection between the swing arm and the base of the miter saw may be electrically lockable, for example using an electromagnetic leaf brake, to prevent the arm from pivoting. The signal to lock the connection may be provided by the detection system. Alternatively, a shock absorber, such as a gas discharge cylinder, may be connected between the swing arm and the base to limit the speed with which the swing arm can pivot relative to the base, as shown at 1180 in FIG. 4. This arrangement also serves to limit how far the blade moves between the time contact between the blade and user is detected, and the time the blade is stopped by the pawl. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

FIG. 4 shows one way to prevent the sudden downward movement of swing arm 1154. Swing arm 1154 includes a cam portion 1170 having a cam surface 1172. Cam portion 1170 may be integral with the swing arm and housing 1156. A stopping pawl 1174 is mounted to vertical support 1104 adjacent cam surface 1172, and an actuator 1176 is positioned adjacent pawl 1174. The actuator 1176 is operatively coupled to the control and detection subsystems associated with brake pawl 60 and cartridge 82 so that when pawl 62 is released, actuator 1176 engages pawl 1174. During normal operation, actuator 1176 maintains the pawl spaced-apart from cam surface 1172. However, once contact between the blade and the user's body is detected, the detection system sends an actuation signal to actuator 1176, which may be the same or a different signal that triggers the release of brake pawl 60. In any event, upon receipt of the actuation signal, the actuator drives against pawl 1174, causing it to pivot into cam surface 1172, preventing further movement of the swing arm. Pawl 1174 may be constructed or coated with a high friction material such as rubber, and/or may be configured with teeth, etc., to increase its braking action. Cam portion 1170 may be modified so that it extends as far as possible from the point around which it pivots, in order to provide as great a moment arm as possible to help stop the downward motion of the swing arm.

The miter saw in FIG. 4 also includes a piston/cylinder 1180 connected between swing arm 1154 and base 1152. That piston/cylinder limits the speed with which the swing arm can pivot relative to the base, and can also serve to stop or limit the downward motion of the blade when accidental contact with the blade is detected.

There are many alternative methods, devices, and configurations for stopping the swing arm from moving down. Any one or more of these alternatives may be used in place of, or in addition to, the pawl and cam configuration illustrated in FIG. 4 and described above. What is important is to provide a mechanical stop to halt the downward motion of the swing arm when the blade contacts a user.

INDUSTRIAL APPLICABILITY

The present invention is applicable to power equipment, and specifically to woodworking equipment such as miter saws, chop saws, radial arm saws, and other equipment that moves a cutting tool down onto or across a workpiece.

A system to stop the motion of a cutting tool may be used alone or in combination with other safety features to maximize the performance of an overall safety system. For example, such a system may be used with a system that quickly stops the rotation of a blade so that the blade simultaneously stops moving toward a user and stops rotating, as described above, or it may provide the primary protection.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
a support structure having a cutting zone;
a rotatable cutting blade supported by the support structure and adapted to be manually advanced by an operator at least partially into the cutting zone to cut a workpiece;
a motor adapted to rotate the cutting blade;
a detection system adapted to detect contact between a person and the cutting blade; and
a reaction system adapted to stop motion of the cutting blade into the cutting zone upon detection of contact but not proximity between a person and the cutting blade by the detection system.

2. The machine of claim 1, where the motor rotates the cutting blade as the cutting blade moves at least partially into the cutting zone, and where the reaction system is adapted to stop the rotation of the cutting blade.

3. The machine of claim 2, where the reaction system includes a first brake mechanism adapted to stop the movement of the cutting blade into the cutting zone, and a second brake mechanism adapted to stop the rotation of the cutting blade.

4. The machine of claim 1, further comprising operative structure adapted to couple the cutting blade to the support structure, where the operative structure is selectively movable relative to the support structure to move the cutting blade into the cutting zone, and where the reaction system is adapted to stop movement of the operative structure relative to the support structure upon detection of contact between a person and the cutting blade by the detection system.

5. The machine of claim 4, where the reaction system includes a pawl mounted on the support structure and selectively movable into contact with the operative structure to grip the operative structure and prevent relative movement between the operative structure and the support structure.

6. The machine of claim 4, where the reaction system includes a pawl mounted on the operative structure and selectively movable into contact with the support structure to grip the support structure and prevent relative movement between the support structure and the operative structure.

7. The woodworking machine of claim 1, where the machine is a radial arm saw and the cutting blade is a circular blade.

8. The radial arm saw of claim 7, where the support structure includes an arm and a bracket configured to slide along the arm, and where the reaction system includes a wedge assembly configured to interrupt the sliding of the bracket along the arm.

9. The radial arm saw of claim 8, where the support structure includes an arm and a bracket configured to slide along the arm, and where the reaction system includes a lockable spool assembly configured to interrupt the sliding of the bracket along the arm.

10. The woodworking machine of claim 1, where the machine is a miter saw and the cutting blade is a circular blade.

11. The miter saw of claim 10, where the support structure includes a base to hold a workpiece to be cut and a swing arm pivotally coupled to the base, where the blade is supported on the swing arm, and where the reaction system includes a piston and cylinder to stop the motion of the blade into the cutting zone upon detection of contact by the detection system.

12. The miter saw of claim 10, where the support structure includes a base to hold a workpiece to be cut and a swing arm pivotally coupled to the base, where the blade is supported on the swing arm, and where the reaction system includes a cam surface and pawl to stop the motion of the blade into the cutting zone upon detection of contact by the detection system.

13. A woodworking machine comprising:
a base configured to rest on a generally horizontal surface to support the machine during operation;
a work surface supported by the base above the generally horizontal surface on which a workpiece may be cut;
a work zone adjacent the work surface;
a rotatable blade adapted to be manually advanced by an operator into the work zone to cut the workpiece;
a motor to rotate the blade;

a detection system adapted to detect contact between a person and the blade; and a reaction system adapted to stop movement of the blade into the work zone upon the detection of the contact but not proximity.

14. The woodworking machine of claim 13, where the woodworking machine is a miter saw, and further comprising a support arm moveable relative to the base, where the blade is mounted for rotation on the support arm, and where the reaction system includes a pawl to engage the blade.

15. The miter saw of claim 14, further comprising a pivot joint between the support arm and base and adapted to allow the support arm to pivot relative to the base, where the blade has a rotational axis, where the blade has a front portion defined as that portion beyond the rotational axis away from the pivot joint, and where the pawl is adapted to engage the blade at a position on the front portion of the blade.

* * * * *